US011004022B1

(12) United States Patent
Ghalaty et al.

(10) Patent No.: US 11,004,022 B1
(45) Date of Patent: May 11, 2021

(54) METHODS AND SYSTEMS FOR IMPROVING AGILITY IN SOURCE CODE PROGRAMMING PROJECTS (71) Applicant: Capital One Services, LLC, McLean, VA (US)

(72) Inventors: Nahid Farhady Ghalaty, McLean, VA (US); Ana Cruz, McLean, VA (US); Christopher Camenares, McLean, VA (US); Lee Adcock, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/791,193

(22) Filed: Feb. 14, 2020

(51) Int. Cl.
*G06Q 10/06* (2012.01)
*H04L 29/08* (2006.01)
*G06N 20/00* (2019.01)
*G06N 3/08* (2006.01)

(52) U.S. Cl.
CPC ..... *G06Q 10/063112* (2013.01); *G06N 3/084* (2013.01); *G06N 20/00* (2019.01); *G06Q 10/06313* (2013.01); *G06Q 10/063118* (2013.01); *H04L 67/10* (2013.01)

(58) Field of Classification Search
USPC ...................................................... 705/7.14
See application file for complete search history.

(56) References Cited

U.S. PATENT DOCUMENTS

| 8,332,251 | B1* | 12/2012 | Morris | G06Q 10/06 705/7.22 |
| 9,720,707 | B1* | 8/2017 | Shook | G06F 9/451 |
| 9,965,272 | B2* | 5/2018 | Madison | G06F 8/30 |
| 10,540,573 | B1* | 1/2020 | Li | G06K 9/6261 |
| 2007/0276712 | A1* | 11/2007 | Kolanchery | G06Q 10/06313 705/7.23 |
| 2008/0167930 | A1* | 7/2008 | Cao | G06Q 10/06 705/7.14 |
| 2011/0081632 | A1* | 4/2011 | Garg | G09B 19/0053 434/118 |
| 2011/0184771 | A1* | 7/2011 | Wells | G06Q 10/04 705/7.14 |
| 2012/0017195 | A1* | 1/2012 | Kaulgud | G06F 11/3692 717/101 |

(Continued)

OTHER PUBLICATIONS

Li, L. (2018). Harnessing teamwork in networks: Prediction, optimization, and explanation (Order No. 10979988). Available from ProQuest Dissertations and Theses Professional. (2154434218). Retrieved from https://dialog.proquest.com/professional/docview/2154434218?accountid=131444 (Year: 2018).*

*Primary Examiner* — Folashade Anderson
(74) *Attorney, Agent, or Firm* — Pillsbury Winthrop Shaw Pittman LLP (57) ABSTRACT

Methods and systems are described for matching contributor skills to required skills in source code programming projects in order to provide more agility for the project team. For example, to provide more agility, the methods and system track contributor skills and assign contributors to contributions based on one or more of a plurality of skills of a contributor not corresponding to a skill required for the project. The methods and system may nonetheless maintain workflow velocity in the source code programming projects.

16 Claims, 5 Drawing Sheets

(56) References Cited

U.S. PATENT DOCUMENTS

| | | | | |
|---|---|---|---|---|
| 2013/0007694 A1* | 1/2013 | Knapp | .................... | G06Q 10/10 |
| | | | | 717/103 |
| 2013/0144914 A1* | 6/2013 | Libal | ..................... | G06F 16/176 |
| | | | | 707/784 |
| 2016/0077832 A1* | 3/2016 | Bhattacharyya | .......... | G06F 8/77 |
| | | | | 717/101 |
| 2016/0132801 A1* | 5/2016 | Kala | ................ | G06Q 10/06395 |
| | | | | 705/7.13 |
| 2016/0132813 A1* | 5/2016 | Kala | ................ | G06Q 10/06395 |
| | | | | 705/7.41 |
| 2018/0068271 A1* | 3/2018 | Abebe | .................... | G06Q 50/01 |
| 2018/0349135 A1* | 12/2018 | Burns | ....................... | G06F 8/70 |

\* cited by examiner

METHODS AND SYSTEMS FOR IMPROVING AGILITY IN SOURCE CODE PROGRAMMING PROJECTS

FIELD OF THE INVENTION

The invention relates to improving agility in source code programming projects.

BACKGROUND

Computer programming is typically a team-based activity, in which the responsibilities for the features and source code necessary to produce a given project (e.g., a software application) are shared among team members. To facilitate this team activity, team members may submit contributions to the project to a distributed version control system. This system may include a codebase that features a full history of the project that is mirrored on every contributor's computer. The system may enable automatic management of different branches of the project as well as the merging of different contributions. The team may also utilize one or more issue management and bug-tracking tools. The team may further out-source some issues to software-as-a-service providers. Accordingly, project management for computer programming often involves multiple team members and service providers sharing multiple versions a single codebase for the project.

Furthermore, responsibilities of each team member are often intertwined. For example, in order to advance a project, one contributor may need to wait for another contributor's submission. In cases of bottlenecks, computer programming contributions are difficult to reassign or have additional contributors assist in currently-in-progress contribution as new contributors may need to be brought up to speed on the current progress. Moreover, source code programming may involve individual stylistic choices that may not be common across the team, and for which variation from the stylistic choice may create issues with the contribution. Accordingly, project management for computer programming often involves selecting contributors for particular contributions such that the time the contributor takes to complete the contribution will not create a bottleneck for the project.

SUMMARY

Methods and systems are described herein for improving agility in source code programming projects. For example, in order to minimize bottlenecks for a project, the system may match the skills of a given contributor to the skills required for a given contribution. While such an arrangement may limit the bottlenecks in the short-term, source code programming projects often require a high degree of agility in its project teams. For example, the system may need to ensure that multiple contributors have complimenting and overlapping skill sets as a project may require multiple contributions to be performed simultaneously that require the same skills. However, if the system simply matches the skills of a given contributor to the skills required for a given contribution to assign contributions, the system prevents contributors from learning new skills and/or gaining experience on new contribution types. That is, while unintuitive, assigning contributions to contributors based on simply matching the contributor's skill set to those required by a contribution leads to a long-term lack of agility for the project team.

Accordingly, the methods and systems described herein matching contributor skills to required skills in source code programming projects in order to provide more agility for the project team. For example, to provide more agility, the methods and system described herein may assign contributors to a given contribution based on one or more of the plurality of skills of the first contributor not corresponding to a skill required for the project. By assigning contributors to a given contribution based on the contributor lacking a required skill, the system allows the contributor to gain that skill and increase the agility of the team.

Furthermore, the methods and systems described herein may additionally prevent reductions to workflow velocity by ensuring that the project team of the contributor includes at least one other contributor with the required skill. For example, by assigning contributors based on the sum of skills of the project team, the system can ensure another contributor is available to assist a contributor learning a new skill. Additionally or alternatively, the system may ensure (e.g., via automatic tagging) that another contributor with the required skill is available to review the contribution of the contributor lacking the skill. In another example, the system prevents reductions to workflow velocity by assigning contributors to a contribution in which they lack a required skill set if the system determines that another skill of the user (or a previous contribution of the user) is sufficiently similar to the required skill (or current contribution).

Additionally or alternatively, the methods and systems described herein may also prevent reductions to workflow velocity by determining that the workflow schedule allows additional time to complete a given contribution (e.g., one assigned to a contributor without a required skill). For example, the system may compare a necessary completion deadline (e.g., in order to prevent bottlenecks) to a likely length of time to complete the contribution for a contributor without a required skill. Based on the comparison, the system may determine that assigning the contribution to the contributor will not negatively affect the workflow velocity.

Additionally or alternatively, the methods and systems described herein may act to limit the negative effects on workflow velocity. For example, the system may determine that based on the number of available contributions needing to be completed exceeding a threshold number and/or the skills of a contributor lacking a required skill for multiple available contributions, workflow velocity is best improved through assigning a given contribution to a given contributor. Thus, by first identifying a contributor without a required skill and then ensuring that assigning that contributor will not negatively effect workflow velocity, the system both increases agility of the project team and maintains workflow velocity.

In one aspect, a method for assigning stories in source code programming projects is described. For example, the system may retrieve, at a software development version control system, a first story from a plurality of stories of a first project, wherein each story of the plurality of stories corresponds to a software feature component for the first project from an end-user perspective. The system may retrieve, at the software development version control system, a story profile for the first story, wherein the story profile indicates that completion of the first story requires a first skill. The system may retrieve, at the software development version control system, a first contributor profile, wherein the first contributor profile indicates a plurality of skills of a first contributor. The system may compare, at the software development version control system, the plurality of skills of the first contributor to the first skill; determining, at the software development version control system, that the plurality of skills of the first contributor does not correspond to the first skill. The system may assign, at the software development version control system, the first contributor to the first story based in response to determining that the plurality of skills of the first contributor does not correspond to the first skill. The system may receive, at the software development version control system, a first contribution from the first contributor, wherein the first contribution corresponds to the first story. The system may then generate, at the software development version control system, the first project with the first contribution.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
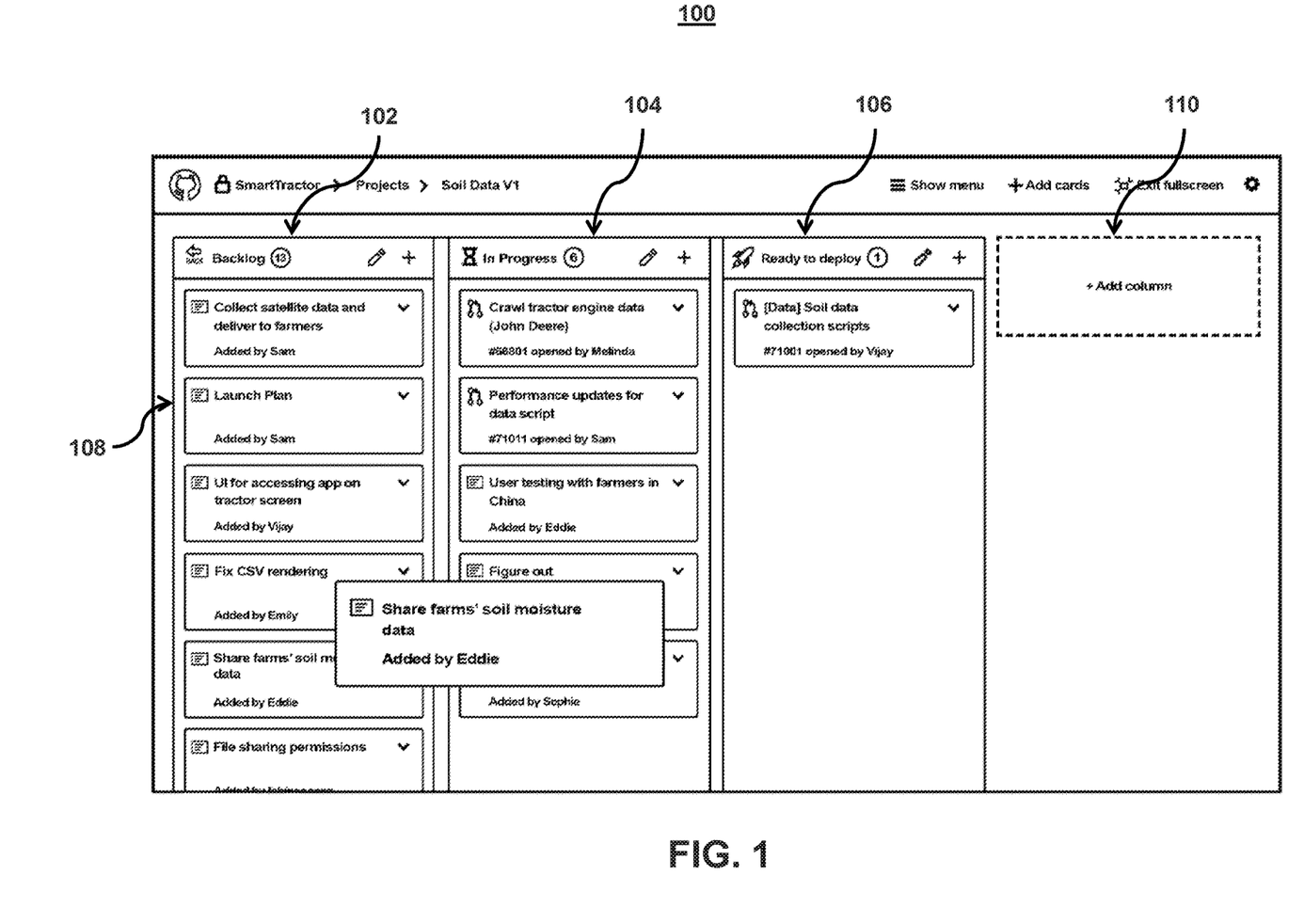
FIG. 1 shows an illustrative user interface for software development version control system for assigning stories in source code programming projects, in accordance with one or more embodiments.

FIG. 1 shows an illustrative user interface for software development version control system for assigning stories in source code programming projects, in accordance with one or more embodiments. For example, FIG. 1 shows user interface 100, which represents a story board of a project management application for source code programming projects. The story board may list outstanding tasks, highlight missing tasks, reveal problems and/or issues in current tasks, and describe complications, if any, in the overall project. This allows the project team to make changes and rearrange tasks as needed before the project advances to the execution phase.

For example, user interface 100 may correspond to a project (e.g., a source code programming project for a new software application). For that project, user interface 100 may include numerous tasks or "stories" that need to be completed in order to complete the project. Each story may correspond to a software feature component for the project from an end-user perspective. That is, each story may describe the sub-features and/or functions of the software feature component. The system may list these sub-features and/or functions as well as a textual description and/or the skills required to complete the story in user interface 100. In some embodiments, the system may include all or parts of this information as metadata for each story (e.g., story 108).

Story 108 may correspond to an individual task needed to complete the project described in user interface 100. Story 108 may be selectable from a user and/or story 108 may be automatically assigned to a given contributor. For example, as described below, story 108 may be assigned to a given contributor based on the skills, stories available, completion deadlines, and/or a combination of these variables. In some embodiments, due to the numerous contributors, skills sets, deadlines, and availability issues, any of which may dynamically change, the system may use machine learning models (e.g., as described in FIG. 2 below) to identify trends and patterns as well as provide recommendations for assignments. Additionally or alternatively, the machine learning models may provide recommended deadlines, estimated lengths of time to complete stories, etc.

Skills may include both technical and non-technical skills. For example, skills may include prior experience on a similar story, feature, or program language. Skills may include assessments of problem-solving skills, technical backgrounds, or "soft skills". Each skill may be defined through either a quantitative or qualitative assessment. For example, a skill may be defined based on a contributor successfully passing a test or having a particular degree. The skill may be defined by the number of files, previous stories, or projects a contributor has contributed to and/or a length of time or experience of the contributor.

The stories for a project may be organized according to common characteristics such as status (e.g., completed, pending, awaiting review, outstanding, etc.). As shown in user interface 100, a set of stories is grouped in column 102 indicating a backlog of stories awaiting peer review. Another set of stories are grouped in column 104 indicating stories that progress. Another set of stories is grouped in column 106 that are ready for deployment. Finally, column 110 indicates additional potential story groupings. For example, outstanding stories awaiting to be assigned and/or stories that have identified issues (e.g., have been reviewed and the review uncovered a potential problem).

The status of the story as well as the required skills, estimated length of time to complete, required completion date, and/or other information may be stored in a story profile. The system may access the story profile in response to a request for information about the story. Similarly, information about a contributor (e.g., past projects, current skills, historical completion time for particular stories, etc.) may be stored in a contributor profile. The system may also store a profile for the project and/or the team that indicates similar information at a team-wide or project-wide level. Finally, the system may store a profile for each skill. The profile may include relevant characteristics or sub-skills for each skill. The system may compare these sub-skills and/or characteristics when determine if two skills are similar (e.g., as described in FIG. 5 below).

As the project progresses, user interface 100 may continue to be updated. Furthermore, the system may continually pull data based on the updates. For example, the system may be integrated into current project management tools in order to improve agility. In some embodiments, this may include the introduction of agile methodology in project planning. The system may work to improve workflow velocity, learning capability of contributors, or function as in an Agile Maturity Matrix ("AMM") scheme. The current assignments, current outstanding deadlines, stories with reported issues, etc. may be feedback into the system to further update user interface 100.

For example, the system may determine skills that a contributor was previously associated with and then determine whether or not the previous skills are substantially similar to the required skills of an available assignment. As the skills of the contributor may continually be updated (e.g., as other stories are complete), the system may update the previously associated skills with new skills. The system may perform the same updates for the team as a whole.

In addition to the status of stories, the skills of a contributor and the team, and story assignments, the system may also monitor peer review assignments. For example, the system may monitor what contributor is already assigned to peer review another contribution. Based on this information, the system may modify other assignments. The system may also receive information from other locations and services. For example, the system may receive information from third party software-as-a-service ("SaaS") providers that indicate the status of other tasks related to the project. These statuses and information about contributors for these tasks may also be fed back into the system.

In some embodiments, user interface 100 may generate recommendation or other media content. For example, the system may generate a recommendation featuring the name of a contributor for a given story. User interface 100 may generate progress recommendation and/or graphical representations of the progress of a given contributor and/or the project based on information received, assignments generated by the system, and/or feedback received at the system.

Figure 2:
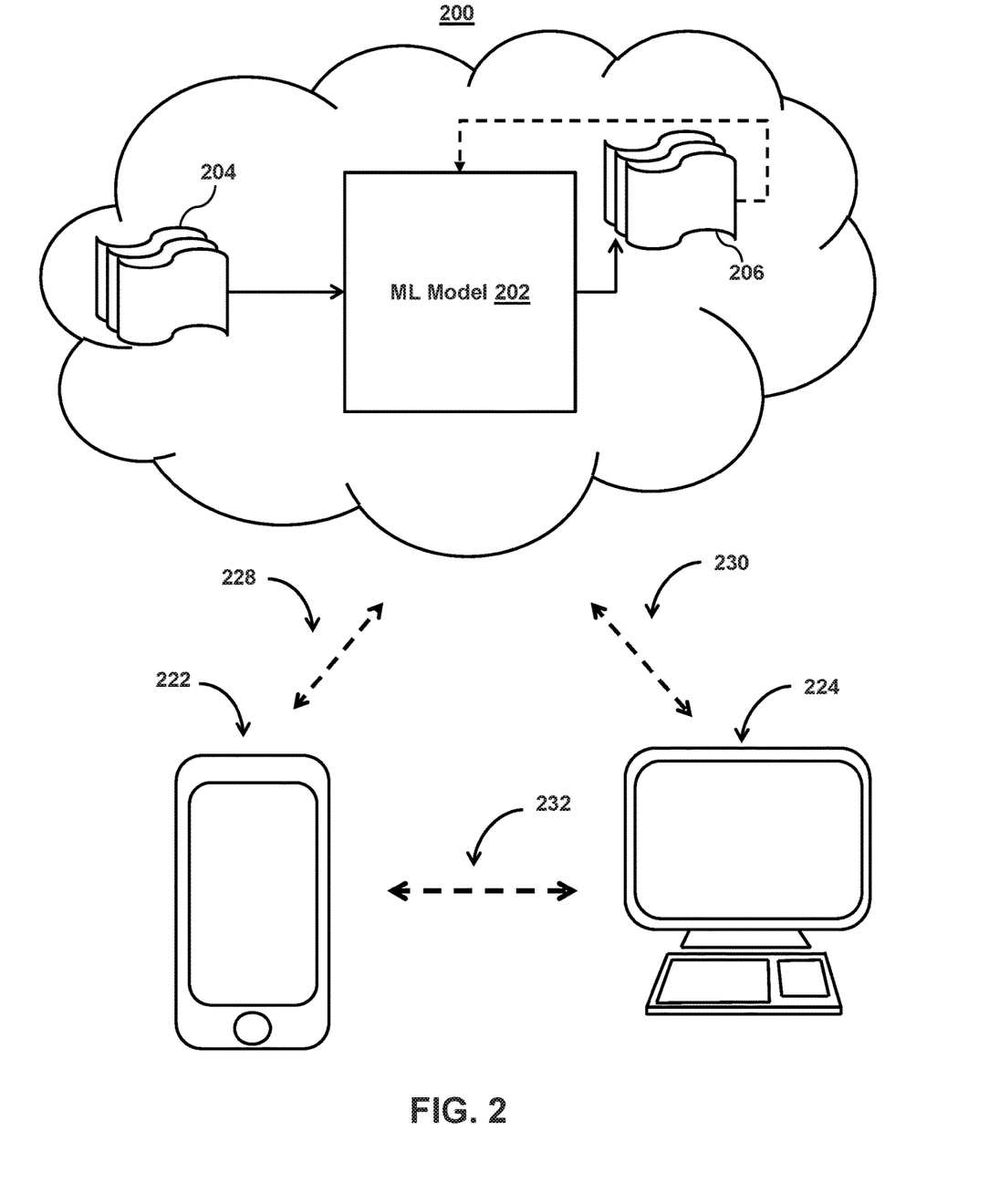
FIG. 2 shows an illustrative system for a software development version control system, in accordance with one or more embodiments.

FIG. 2 shows an illustrative system for a software development version control system, in accordance with one or more embodiments. As shown in FIG. 2, system 200 may include user device 222, user device 224, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 222 and user device 224 may include a desktop computer, a server, or other client device. Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 222, those operations may, in some embodiments, be performed by components of user device 224. System 200 also includes machine learning model 202, which may be implemented on user device 222 and user device 224, or accessible by communication paths 228 and 230, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications network or combinations of communications networks. Communication paths 228, 230, and 232 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 2, machine learning model 202 may take inputs 204 and provide outputs 206. The inputs may include multiple data sets such as a training data set and a test data set. Each of the plurality of data sets (e.g., inputs 204) may include data subsets with common characteristics. The common characteristics may include characteristics about a user, assignments, user actions, and/or characteristics of a user actions. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, machine learning model 202 may include an artificial neural network. In such embodiments, machine learning model 202 may include input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202 (e.g., whether a first length of time corresponds to lengths of programming time for previously completed stories by contributors without a required skill).

Figure 3:
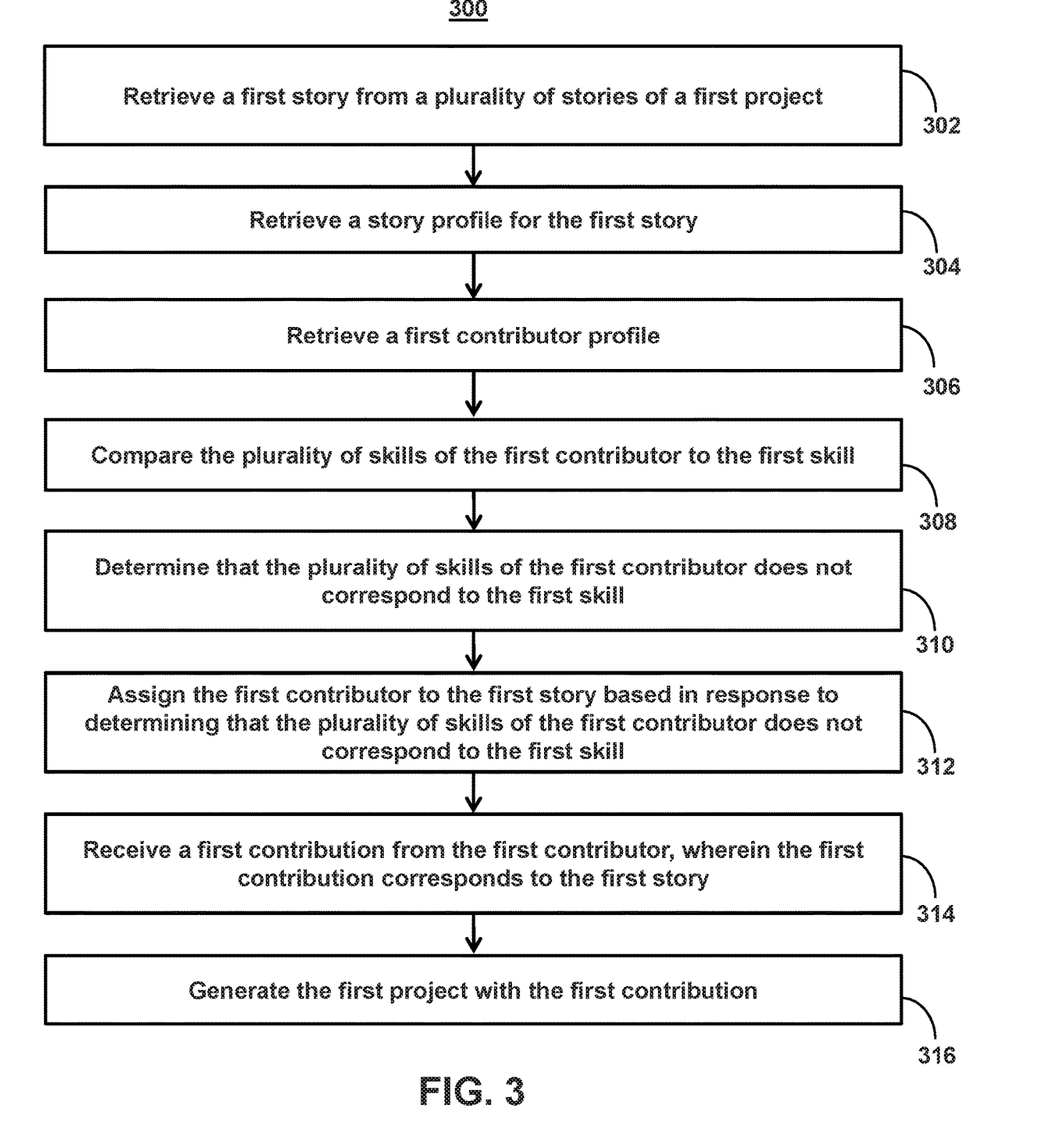
FIG. 3 shows a flowchart of the steps involved in generating a project based on contributions from multiple contributors, in accordance with one or more embodiments.

FIG. 3 shows a flowchart of the steps involved in generating a project based on contributions from multiple contributors, in accordance with one or more embodiments. For example, process 300 may represent the steps taken by one or more devices as shown in FIGS. 1-2. For example, process 300 may be performed by a software development version control system that includes cloud-based memory configured to store a plurality of stories of a first project and cloud-based control and I/O circuitry.

At step 302, process 300 retrieves (e.g., at a software development version control system) a first story from a plurality of stories of a first project. For example, each story of the plurality of stories may correspond to a software feature component for the first project from an end-user perspective. For example, the story may correspond to story 108 (FIG. 1).

At step 304, process 300 retrieves (e.g., at a software development version control system) a story profile for the first story. For example, the story profile may indicate that completion of the first story requires a first skill. The story profile may be stored by the system as metadata. Alternatively, in order to conserve memory, the story profile may be located at a record with a reference to the story profile stored as metadata.

At step 306, process 300 retrieves (e.g., at a software development version control system) a first contributor profile. The first contributor profile may indicate a plurality of skills of a first contributor. The contributor profile may be stored by the system as metadata. Alternatively, in order to conserve memory, the contributor profile may be located at a record with a reference to the contributor profile stored as metadata.

At step 308, process 300 compares (e.g., at a software development version control system) the plurality of skills of the first contributor to the first skill. To search and compare the different kinds of information, the system may use multiple types of parsing and text/object recognition, including fuzzy logic. For example, the particular information (e.g., a required skill) may be found in a data field that may be a textual data field. Using fuzzy logic, the system may determine two fields to be identical (or different) even though the substance of the data field is not identical. In some embodiments, the system may analyze particular data fields of the first kind of information and the second kind of information for particular values or text.

At step 310, process 300 determines (e.g., at a software development version control system) that the plurality of skills of the first contributor does not correspond to the first skill. For example, the system may iterate through each of the plurality of skills of the user comparing each skill to the required skills of the story (e.g., as retrieved from a story profile). The system may determine if the currently iterated skill matches any of the required skills. Alternatively, the system may input each of the skills of the user into a lookup table database that lists the required skills for each story.

At step 312, process 300 assigns (e.g., at a software development version control system) the first contributor to the first story based in response to determining that the plurality of skills of the first contributor does not correspond to the first skill. For example, in response to determining that the contributor lacks a required skill, the system assigns the contributor to the story.

In order to prevent a decrease in workflow velocity (e.g., as the first contributor does not have the required skills), the system may perform additional determinations in response to determining that the plurality of skills of the first contributor does not correspond to the first skill. For example, as described in FIG. 4 below, the system may determine if another contributor has the first skill and/or as described in FIG. 5, the system may determine if the first contributor has a skill that is sufficiently similar to the first skill.

In some embodiments, the system may automatically tag the first contribution for peer review. For example, the system may flag the first contribution as it was generated by a contributor without a required skill. The system may further add this flag and a description of the cause of the flag, which may include the name of the first contributor, the missing required skill, etc.) to the story profile.

In some embodiments, the system may determine if the current project timeline includes spare time to compensate for delays to the completion of the story due to the first contributor lacking the required skill. For example, the system may determine a completion deadline for the first story (e.g., as retrieved from the story profile). The system may then determine a first length of time, wherein the first length of time indicates a likely length of time required to complete the first story for a contributor without the first skill. This length of time may be generated based on an analysis of historical contributor data, story data, project data, and/or team data. For example, the system may determine a likely length of time based on the average time to complete a story with a contributor is missing the required skill and/or a particular number of skills. The system then determines whether or not the first length of time is within the completion deadline. If so, the system assigns the first story to the first contributor.

In some embodiments, the system may generate length of time using a machine learning model (e.g., machine learning model 202 (FIG. 2)) that compares lengths of programming time for previously completed stories by contributors without a required skill. For example, machine learning model 202 may analyze data from multiple sources to provide real-time analysis and predictions.

In some embodiments, the system may determine whether or not assigning the first story to another contributor will hinder workflow velocity more than assigning the first story to the first contributor. For example, in response to determining that the plurality of skills of the first contributor does not correspond to the first skill, the system may determine another contributor (with the first skill is available). To do this, the system may determine the completion deadline based on an estimated availability date of a contributor with the first skill. For example, the system may determine if the likely length of time required to complete the first story for a contributor without the first skill is before or after the time when a contributor with the skill is available.

In another example, the system may determine if other stories are available for the first contributor (e.g., stories in which the first contributor has the required skills). If not, the system may assign the first story to the first contributor. For example, the system may determine a number of available stories of the plurality of stories. The system may then compare the number to a threshold number (e.g., one). The system may determine whether or not the number is below the threshold number. If so, the system may assign the first story to the first contributor.

Additionally or alternatively, the system may determine if the first contributor is capable of completing a different story. If not, the system may assign the first contributor to the first story. For example, the system may retrieve a second story from the plurality of stories. The system may then determine that completion of the second story requires a second skill. In response, the system may compare the plurality of skills of the first contributor to the second skill. The system may then determine whether or not the plurality of skills of the first contributor does not correspond to the second skill. If it does not (e.g., the first contributor does not have a required skill for either the first or second story), the system may assign the first story to the user.

At step 314, process 300 receives a first contribution from the first contributor. For example, the first contribution may correspond to the first story. The system may update the status (e.g., as shown in user interface 100 (FIG. 1)) in response to receiving the contribution. In some embodiments, the system may change data in the story profile to reflect that the first story is not ready for peer review.

At step 316, process 300 generates the first project with the first contribution. For example, the system may integrate the first contribution with other contributions in order to complete the project. Accordingly, the system progresses towards completion of the project while increasing overall agility of the team.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one of more of the steps in FIG. 3.

Figure 4:
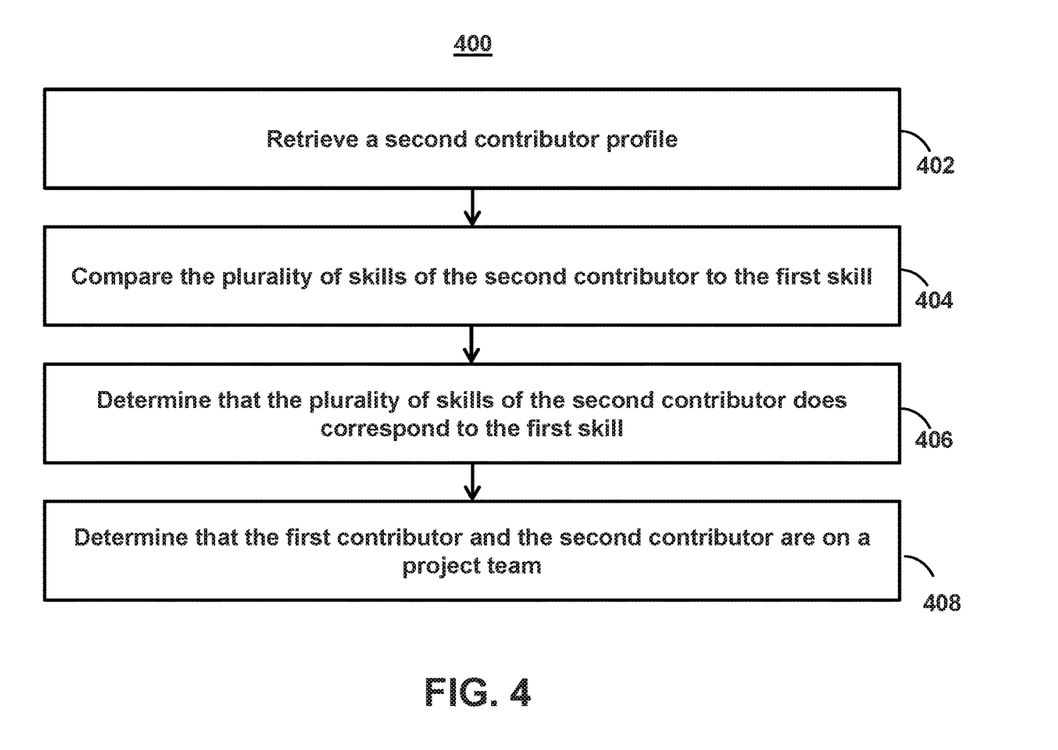
FIG. 4 shows a flowchart of the steps involved in assigning a story to a contributor based on the skills of another contributor on the project team, in accordance with one or more embodiments.

FIG. 4 shows a flowchart of the steps involved in assigning a story to a contributor based on the skills of another contributor on the project team, in accordance with one or more embodiments. For example, process 400 may represent the steps taken by one or more devices as shown in FIGS. 1-2.

At step 402, process 400 retrieves (e.g., at a software development version control system) a second contributor profile. For example, the second contributor profile indicates a plurality of skills of a second contributor. The second contributor may be a member of the same project team as the first contributor. For example, in response to determining that the plurality of skills of the first contributor does not correspond to a skill required by an available story, the system may determine the skills of a team member of the first contributor.

At step 404, process 400 compares (e.g., at a software development version control system) the plurality of skills of the second contributor to the first skill. For example, in order to maintain velocity workflow, the system may determine that another member of the project team has the required skill for a story that the assigned contributor lacks. Velocity workflow may be maintained because the second contributor may be assigned to mentor and/or review the contribution of the first contributor.

At step 406, process 400 determines (e.g., at a software development version control system) that the plurality of skills of the second contributor does correspond to the first skill. For example, in response to determining that the plurality of skills of the first contributor does not correspond to the skill required by a story, the system may determine if the plurality of skills of the second contributor corresponds to the skill.

At step 408, process 400 determines (e.g., at a software development version control system) that the first contributor and the second contributor are on a project team. For example, in response to determining that the first contributor and the second contributor are on the same project team, the system may assign the first contributor the story despite the first contributor lacking the required skill. In some embodiments, the system may assign the second contributor to review the first contribution during its peer review phase (e.g., as described in FIG. 1). Additionally or alternatively, the system may automatically tag the first contribution for peer review by the second contributor.

It is contemplated that the steps or descriptions of FIG. 4 may be used with any other embodiments of this disclosure.

In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one of more of the steps in FIG. 4.

Figure 5:
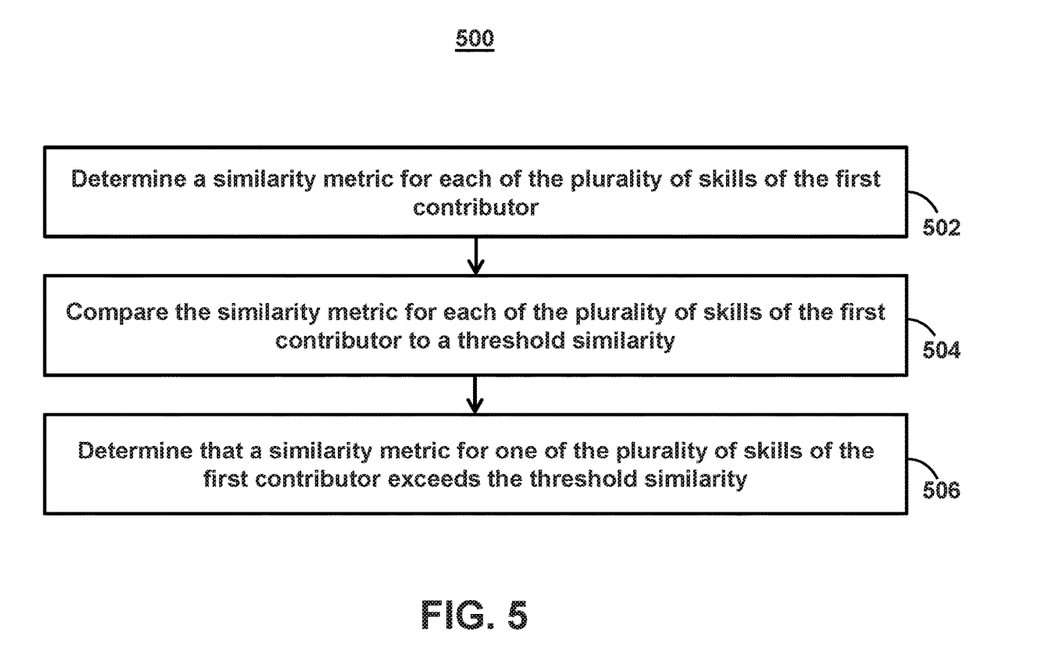
FIG. 5 shows a flowchart of the steps involved in assigning a story to a contributor based on a similarity metric, in accordance with one or more embodiments.

FIG. 5 shows a flowchart of the steps involved in assigning a story to a contributor based on a similarity metric, in accordance with one or more embodiments. For example, process 500 may represent the steps taken by one or more devices as shown in FIGS. 1-2.

At step 502, process 500 determines (e.g., at a software development version control system) a similarity metric for each of the plurality of skills of the first contributor. For example, the similarity metric may indicate a degree of similarity between each of the plurality of skills of the first contributor and the first skill. The similarity metric may be a quantitative or qualitative assessment of the similarity between the skills. It should also be noted that in some embodiments, the system may determine a similarity metric between stories. For example, the system may determine how similar two stories (e.g., a previously completed story and a story needing to be completed) are. The system may then assign a story based on the similarity.

At step 504, process 500 compares (e.g., at a software development version control system) the similarity metric for each of the plurality of skills of the first contributor to a threshold similarity. For example, the system may compare each skill of a contributor (e.g., as retrieved from a contributor profile) to each required skill of a story needing to be completed. The comparison may involve the comparison of sub-skills, characteristics, and/or textual descriptions of the skills.

At step 506, process 500 determines (e.g., at a software development version control system) that a similarity metric for one of the plurality of skills of the first contributor exceeds the threshold similarity. For example, the system may determine a number or percentage of similarities between sub-skills, characteristics, and/or textual descriptions of the skills. Alternatively or additionally, the system may determine if a particular sub-skill, characteristic, and/or textual description is present (e.g., a primary sub-skill, characteristic, and/or keyword).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for assigning stories in source code programming projects, the method comprising: retrieving, at a software development version control system, a first story from a plurality of stories of a first project, wherein each story of the plurality of stories corresponds to a software feature component for the first project from an end-user perspective; retrieving, at the software development version control system, a story profile for the first story, wherein the story profile indicates that completion of the first story requires a first skill; retrieving, at the software development version control system, a first contributor profile, wherein the first contributor profile indicates a plurality of skills of a first contributor; comparing, at the software development version control system, the plurality of skills of the first contributor to the first skill; determining, at the software development version control system, that the plurality of skills of the first contributor does not correspond to the first skill; assigning, at the software development version control system, the first contributor to the first story based in response to determining that the plurality of skills of the first contributor does not correspond to the first skill; receiving, at the software development version control system, a first contribution from the first contributor, wherein the first contribution corresponds to the first story; and generating, at the software development version control system, the first project with the first contribution.

2. The method of embodiment 1, further comprising: retrieving a second contributor profile, wherein the second contributor profile indicates a plurality of skills of a second contributor; comparing the plurality of skills of the second contributor to the first skill; determining that the plurality of skills of the second contributor does correspond to the first skill; and determining that the first contributor and the second contributor are on a project team.

3. The method of embodiment 1 or 2, further comprising assigning the second contributor to review the first contribution.

4. The method of any one of embodiments 1-3, further comprising automatically tagging the first contribution for peer review.

5. The method of any one of embodiments 1-4, further comprises: determining a similarity metric for each of the plurality of skills of the first contributor, wherein the similarity metric indicates a degree of similarity between each of the plurality of skills of the first contributor and the first skill; comparing the similarity metric for each of the plurality of skills of the first contributor to a threshold similarity; and determining that a similarity metric for one of the plurality of skills of the first contributor exceeds the threshold similarity.

6. The method of any one of embodiments 1-5, further comprising: determining a completion deadline for the first story; determining a first length of time, wherein the first length of time indicates a likely length of time required to complete the first story for a contributor without the first skill; and determining that the first length of time is within the completion deadline.

7. The method of embodiment 6, wherein the first length of time is generated using a machine learning model that compares lengths of programming time for previously completed stories by contributors without a required skill.

8. The method of embodiment 6, wherein the completion deadline is based on an estimated availability date of a contributor with the first skill.

9. The method of any one of embodiments 1-8, further comprising: determining a number of available stories of the plurality of stories; comparing the number to a threshold number; and determining that the number is below the threshold number.

10. The method of any one of embodiments 1-9, further comprising: retrieving a second story from the plurality of stories; determining that completion of the second story requires a second skill; comparing the plurality of skills of the first contributor to the second skill; and determining that the plurality of skills of the first contributor does not correspond to the second skill.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A software development version control system for assigning stories in source code programming projects using machine learning models, comprising:
    cloud-based memory configured to store:
        a plurality of stories of a first project, wherein each story of the plurality of stories defines a software feature for the first project from an end-user perspective; and
        a training data set, wherein the training data set includes characteristics about programming times for previously completed stories by contributors without required skills;
        a machine learning model, trained using the training data set, that compares lengths of programming time for previously completed stories by contributors without the required skills to determine likely lengths of time required to complete stories for contributors without the required skills, wherein the machine learning model updates its configurations based on assessments of its predictions and reference feedback information in order to generate more precise predictions, and wherein the machine learning model is an artificial neural network that includes an input layer, one or more hidden layers, and an output layer that corresponds to classifications of likely lengths of time required to complete stories for contributors without the required skills;
    cloud-based control circuitry configured to:
        retrieve a first story from the plurality of stories of the first project;
        retrieve a story profile for the first story, wherein the story profile indicates that completion of the first story requires a first skill;
        retrieve a first contributor profile, wherein the first contributor profile indicates a plurality of skills of a first contributor;
        compare the plurality of skills of the first contributor to the first skill;
        determine that the plurality of skills of the first contributor does not correspond to the first skill;
        determine a completion deadline for the first story;
        determine a first length of time using the machine learning model;
        determine that the first length of time is within the completion deadline;
        assign the first contributor to the first story based in response to determining that the plurality of skills of the first contributor does not correspond to the first skill;
        receive a first contribution from the first contributor, wherein the first contribution corresponds to the first story; and
        generate the first project with the first contribution; and
    cloud-based I/O circuitry configured to generate for display, on a local display device, the first project with the first contribution.

2. A method for assigning stories in source code programming projects using machine learning models, the method comprising:
    retrieving, at a software development version control system, a first story from a plurality of stories of a first project;
    retrieving, at the software development version control system, a story profile for the first story, wherein the story profile indicates that completion of the first story requires a first skill;
    retrieving, at the software development version control system, a first contributor profile, wherein the first contributor profile indicates a plurality of skills of a first contributor;
    comparing, at the software development version control system, the plurality of skills of the first contributor to the first skill;
    determining, at the software development version control system, that the plurality of skills of the first contributor does not correspond to the first skill;
    determining a completion deadline for the first story;
    determining a first length of time, wherein the first length of time indicates a likely length of time required to complete the first story for a contributor without the first skill, wherein the first length of time is generated using a machine learning model, and wherein the machine learning model is trained using a training data set, wherein the training data set includes characteristics about programming times for previously completed stories by contributors without required skills, and wherein the machine learning model compares lengths of programming time for previously completed stories by contributors without the required skills to determine likely lengths of time required to complete stories for contributors without the required skills, wherein the machine learning model updates its configurations based on assessments of its predictions and reference feedback information in order to generate more precise predictions, and wherein the machine learning model is an artificial neural network that includes an input layer, one or more hidden layers, and an output layer that corresponds to classification of likely lengths of time required to complete stories for contributors without the required skills;
    determining that the first length of time is within the completion deadline;
    in response to determining that the first length of time is within the completion deadline, assigning, at the software development version control system, the first contributor to the first story based in response to determining that the plurality of skills of the first contributor does not correspond to the first skill;
receiving, at the software development version control system, a first contribution from the first contributor, wherein the first contribution corresponds to the first story; and
generating, at the software development version control system, the first project with the first contribution.

3. The method of claim 2, further comprising:
retrieving a second contributor profile, wherein the second contributor profile indicates a plurality of skills of a second contributor;
comparing the plurality of skills of the second contributor to the first skill;
determining that the plurality of skills of the second contributor does correspond to the first skill; and
determining that the first contributor and the second contributor are on a project team.

4. The method of claim 3, further comprising assigning the second contributor to review the first contribution.

5. The method of claim 2, further comprising automatically tagging the first contribution for peer review.

6. The method of claim 2, further comprises:
determining a similarity metric for each of the plurality of skills of the first contributor, wherein the similarity metric indicates a degree of similarity between each of the plurality of skills of the first contributor and the first skill;
comparing the similarity metric for each of the plurality of skills of the first contributor to a threshold similarity; and
determining that a similarity metric for one of the plurality of skills of the first contributor exceeds the threshold similarity.

7. The method of claim 2, wherein the completion deadline is based on an estimated availability date of a contributor with the first skill.

8. The method of claim 2, further comprising:
determining a number of available stories of the plurality of stories;
comparing the number to a threshold number; and
determining that the number is below the threshold number.

9. The method of claim 2, further comprising:
retrieving a second story from the plurality of stories;
determining that completion of the second story requires a second skill;
comparing the plurality of skills of the first contributor to the second skill; and
determining that the plurality of skills of the first contributor does not correspond to the second skill.

10. A non-transitory computer-readable medium for assigning stories in source code programming projects using machine learning models comprising instructions that, when executed by one or more processors, cause operations comprising:
retrieving a first story from a plurality of stories of a first project;
retrieving a story profile for the first story, wherein the story profile indicates that completion of the first story requires a first skill;
retrieving a first contributor profile, wherein the first contributor profile indicates a plurality of skills of a first contributor;
comparing the plurality of skills of the first contributor to the first skill;
determining that the plurality of skills of the first contributor does not correspond to the first skill;
determining a completion deadline for the first story;
determining a first length of time, wherein the first length of time indicates a likely length of time required to complete the first story for a contributor without the first skill, wherein the first length of time is generated using a machine learning model, and wherein the machine learning model is trained using a training data set, wherein the training data set includes characteristics about programming times for previously completed stories by contributors without required skills, and wherein the machine learning model compares lengths of programming time for previously completed stories by contributors without the required skills to determine likely lengths of time required to complete stories for contributors without the required skills, wherein the machine learning model updates its configurations based on assessments of its predictions and reference feedback information in order to generate more precise predictions, and wherein the machine learning model is an artificial neural network that includes an input layer, one or more hidden layers, and an output layer that corresponds to classification of likely lengths of time required to complete stories for contributors without the required skills;
determining that the first length of time is within the completion deadline;
assigning the first contributor to the first story based in response to determining that the plurality of skills of the first contributor does not correspond to the first skill in response to determining that the first length of time is within the completion deadline;
receiving a first contribution from the first contributor, wherein the first contribution corresponds to the first story; and
generating the first project with the first contribution.

11. The non-transitory computer-readable medium of claim 10, further comprising instructions that, when executed by the one or more processors, cause operations comprising:
retrieving a second contributor profile, wherein the second contributor profile indicates a plurality of skills of a second contributor;
comparing the plurality of skills of the second contributor to the first skill;
determining that the plurality of skills of the second contributor does correspond to the first skill; and
determining that the first contributor and the second contributor are on a project team.

12. The non-transitory computer-readable medium of claim 11, further comprising instructions that, when executed by the one or more processors, cause operations comprising assigning the second contributor to review the first contribution and automatically tagging the first contribution for peer review.

13. The non-transitory computer-readable medium of claim 10, further comprising instructions that, when executed by the one or more processors, cause operations comprising:
determining a similarity metric for each of the plurality of skills of the first contributor, wherein the similarity metric indicates a degree of similarity between each of the plurality of skills of the first contributor and the first skill;

comparing the similarity metric for each of the plurality of skills of the first contributor to a threshold similarity; and determining that a similarity metric for one of the plurality of skills of the first contributor exceeds the threshold similarity.

14. The non-transitory computer-readable medium of claim 10, wherein the completion deadline is based on an estimated availability date of a contributor with the first skill.

15. The non-transitory computer-readable medium of claim 10, further comprising instructions that, when executed by the one or more processors, cause operations comprising:

determining a number of available stories of the plurality of stories;

comparing the number to a threshold number; and determining that the number is below the threshold number.

16. The non-transitory computer-readable medium of claim 10, further comprising instructions that, when executed by the one or more processors, cause operations comprising:

retrieving a second story from the plurality of stories;

determining that completion of the second story requires a second skill;

comparing the plurality of skills of the first contributor to the second skill; and determining that the plurality of skills of the first contributor does not correspond to the second skill.

\* \* \* \* \*